United States Patent [19]

DuBois et al.

[11] 4,448,662

[45] May 15, 1984

[54] SOLID POLYMER ELECTROLYTE CHLOR-ALKALI ELECTROLYTIC CELL

[75] Inventors: Donald W. DuBois, Corpus Christi; William B. Darlington, Portland, both of Tex.

[73] Assignee: PPG Industries, Inc., Pittsburgh, Pa.

[21] Appl. No.: 496,031

[22] Filed: May 19, 1983

Related U.S. Application Data

[60] Continuation of Ser. No. 382,450, May 24, 1982, abandoned, which is a division of Ser. No. 076,898, Sep. 19, 1979, Pat. No. 4,342,629.

[51] Int. Cl.³ .............................................. C25C 17/12
[52] U.S. Cl. .................................... 204/252; 204/266; 204/283
[58] Field of Search ................. 204/98, 128, 283, 258, 204/252, 256, 266

[56] References Cited

U.S. PATENT DOCUMENTS

| | | | |
|---|---|---|---|
| 4,056,452 | 11/1977 | Campbell | 204/258 |
| 4,065,366 | 12/1977 | Oda et al. | 204/98 |
| 4,268,365 | 5/1981 | Iijima et al. | 204/98 |

Primary Examiner—Richard L. Andrews
Attorney, Agent, or Firm—Mark Levin; Richard M. Goldman

[57] ABSTRACT

Disclosed is a solid polymer electrolyte electrolytic cell, e.g., for chlorine production, where the electrodes are in compressive contact with and removable from the permionic membrane.

4 Claims, 14 Drawing Figures

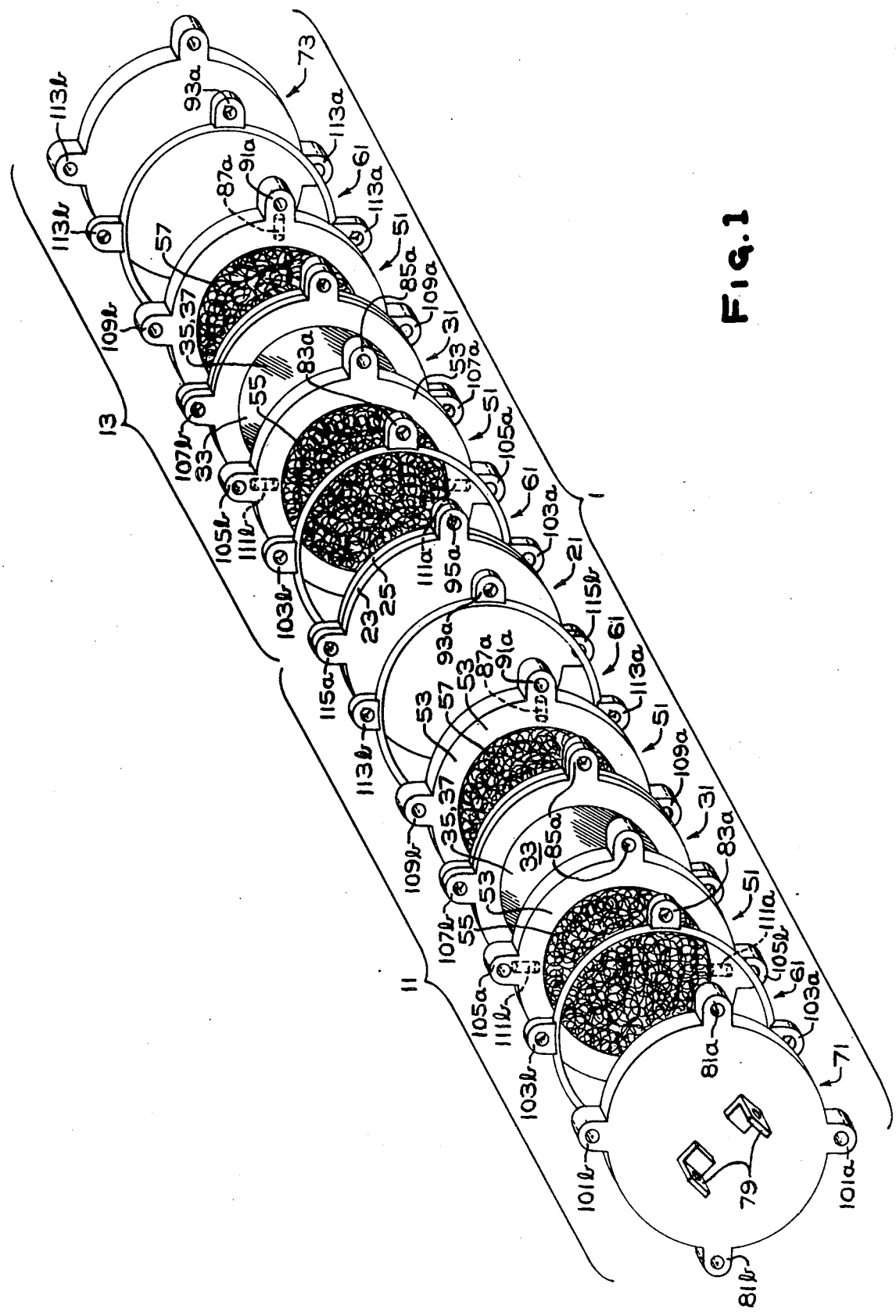

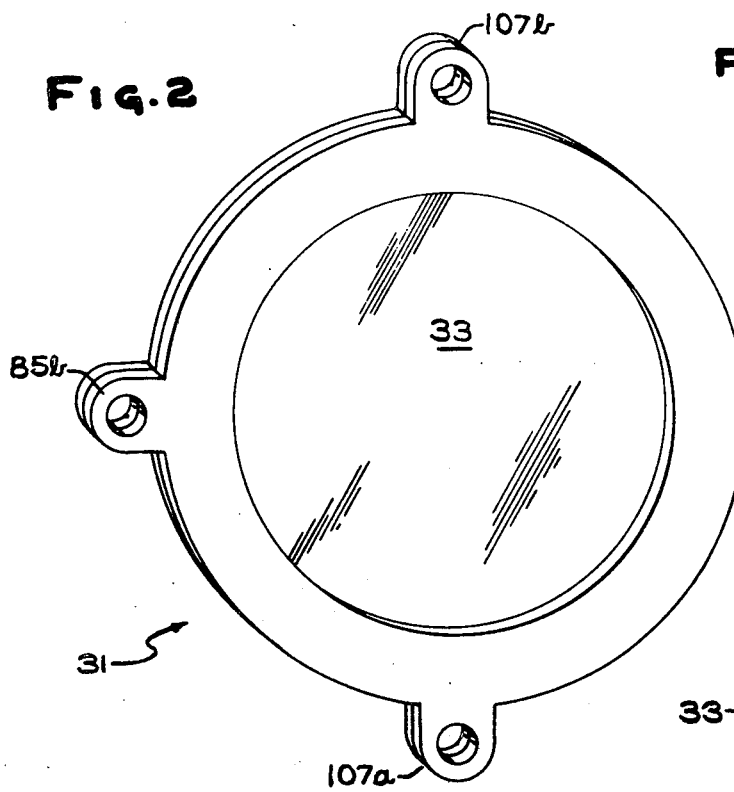
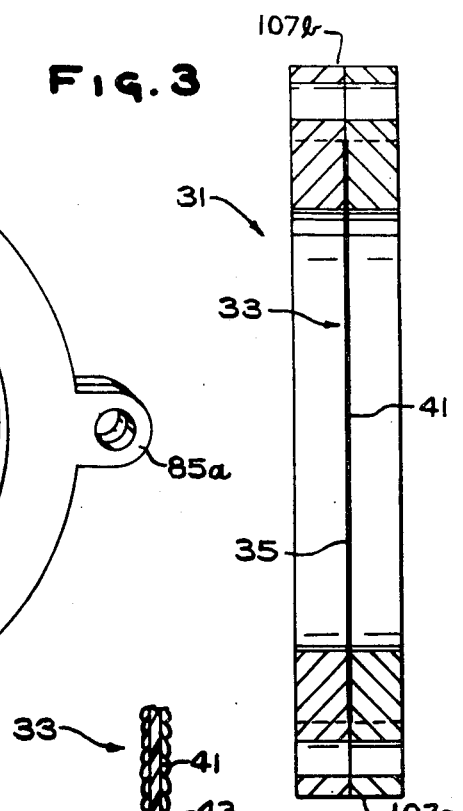
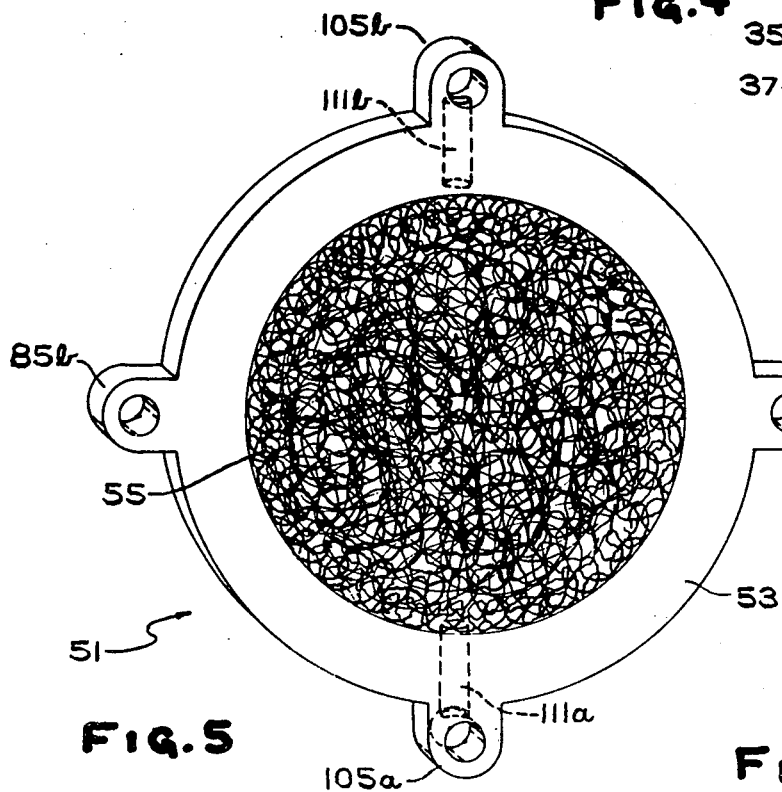
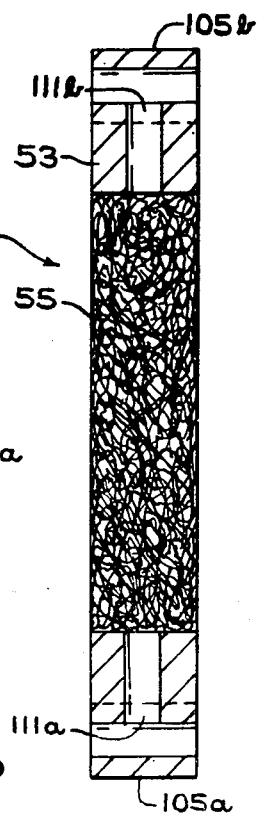

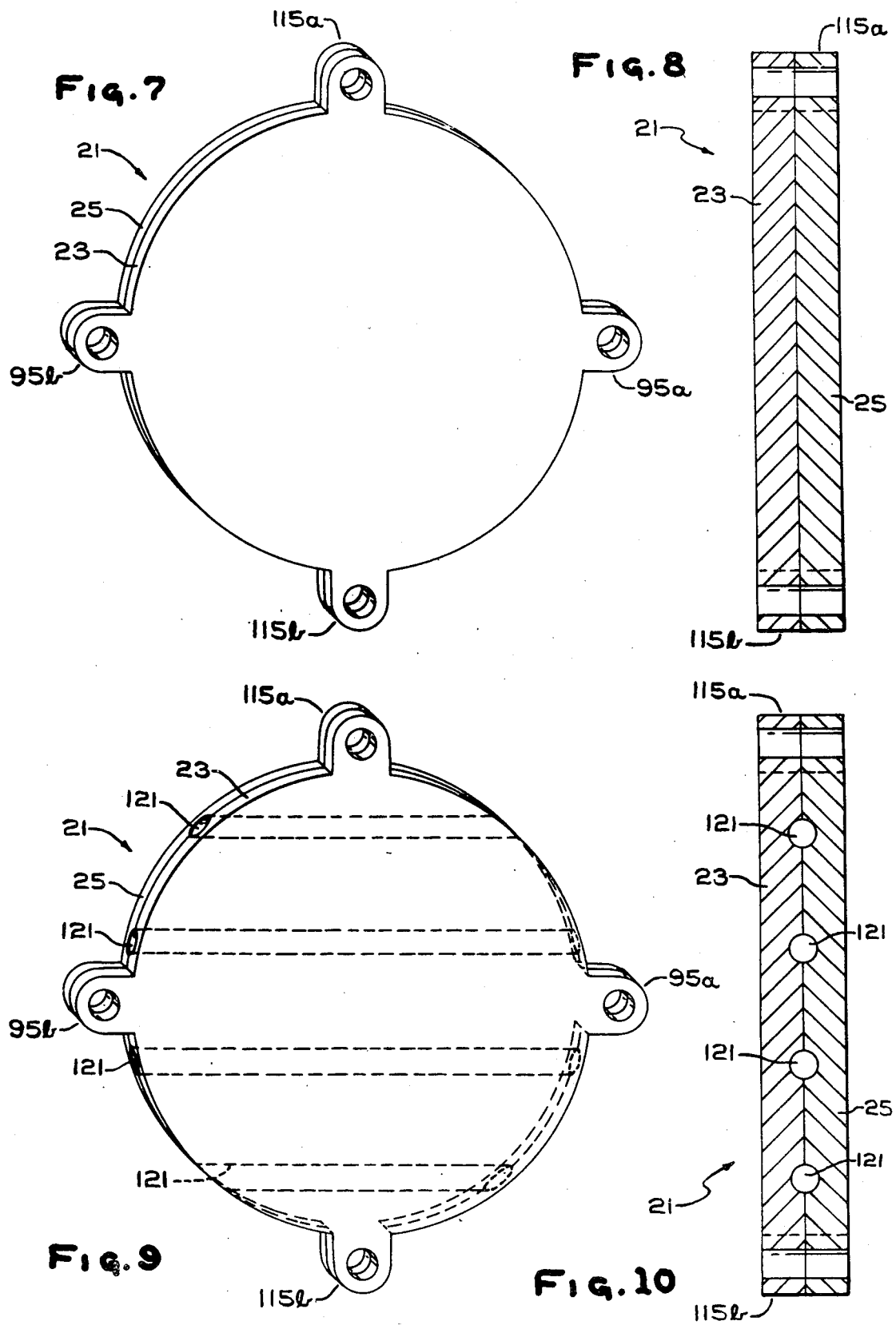

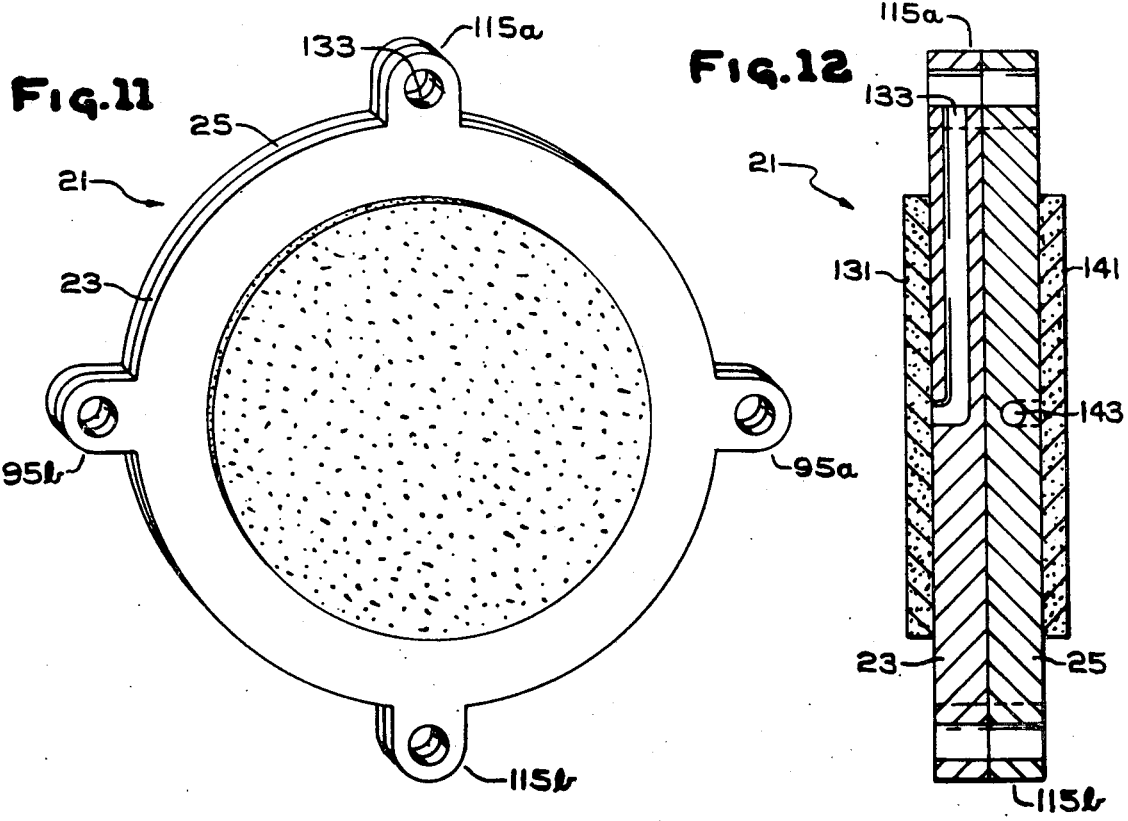
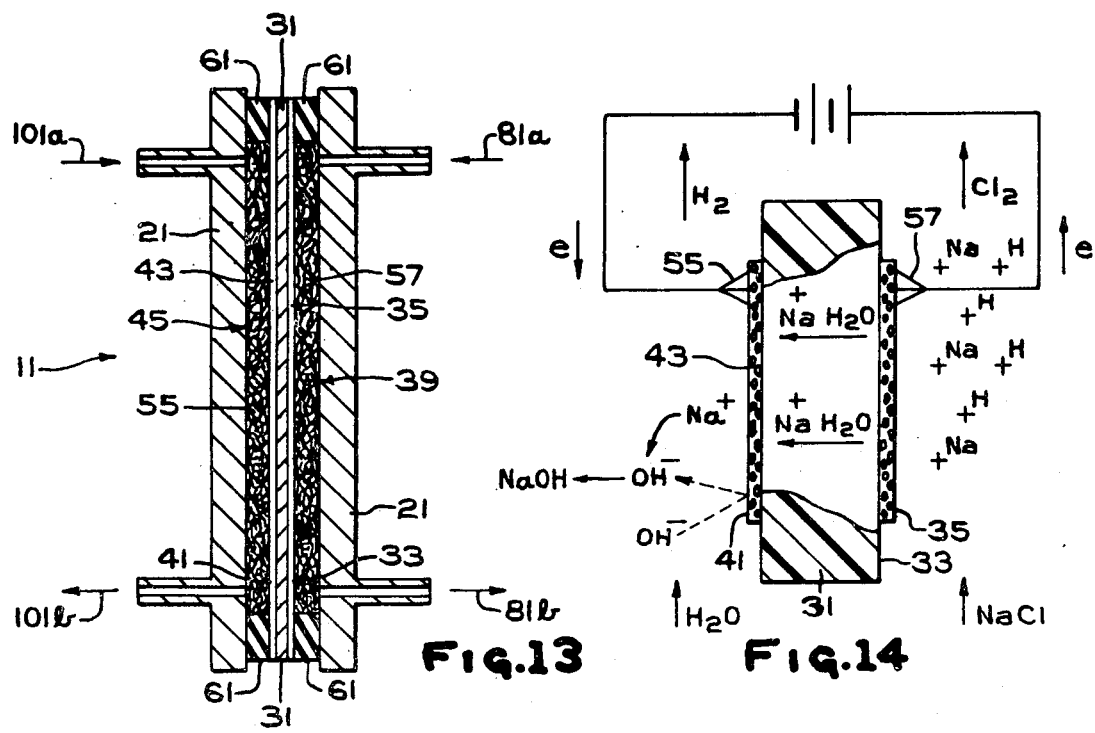

SOLID POLYMER ELECTROLYTE CHLOR-ALKALI ELECTROLYTIC CELL

This is a continuation of application Ser. No. 382,450, filed May 24, 1982, now abandoned, which is a division of U.S. application Ser. No. 76,898, filed Sept. 19, 1979, now U.S. Pat. No. 4,342,629.

DESCRIPTION OF THE INVENTION

Solid polymer electrolyte chlor alkali cells may have a cation selective permionic membrane with either the anodic electrocatalyst bearing on the anodic surface of the membrane, that is, in contact with but not physically or chemically bonded to the anolyte facing surface of the permionic membrane, or a cathodic hydroxyl evolution catalyst, i.e., a cathodic electrocatalyst, bearing on the cathodic surface of the membrane, that is in contact with but not physically or chemically bonded to the catholyte facing surface of the permionic membrane or both the anodic and cathodic electrocatalyst bearing upon but not physically or chemically bonded to the permionic membrane. In an alternative exemplification, a cathode depolarizer, also known equivalently as an $HO_2^-$ disproportionation catalyst may bear upon the cathodic surface, that is in contact with but not physically or chemically bonded to the catholyte facing surface of the permionic membrane. This $HO_2^-$ disproportionation catalyst serves to depolarize the cathode and avoid the formation of gaseous hydrogen.

As herein contemplated there is no liquid gap, that is, no electrolyte gap between the electrocatalyst bearing upon the permionic membrane, and the membrane. In this way, the high current density and low voltage of a solid polymer electrolyte cell is obtained while simple, mechanical current collectors and electrode supports are retained. As herein contemplated one surface of the permionic membrane may have the electrocatalyst physically or chemically bonded thereto or embedded therein, and the opposite electrocatalyst bearing on the opposite surface of the permionic membrane but not physically or chemically bonded thereto. Alternatively, both surfaces of the permionic membrane may have electrocatalysts of proper polarity bearing upon thereon but not physically or chemically bonded thereto.

Solid polymer electrolyte chlor alkali electrolyzers herein contemplated retain the expected advantages of solid polymer electrolytes having the electrocatalysts deposited in or on the permionic membrane, i.e., high production per unit volume of cell, high current efficiency, and all at voltages lower than that of a conventional permionic membrane electrolyte cell, and in an alternative exemplification, the avoidance of gaseous products and the concomittant auxiliaries necessitated by gaseous products.

In the solid polymer electrolyte chlor alkali process aqueous alkali metal chloride, such as sodium chloride or potassium chloride, contacts the anodic surface of the solid polymer electrolyte. An electrical potential is imposed across the cell with chlorine being evolved at the anodic surface of the solid polymer electrolyte.

Alkali metal ion, that is sodium ion or potassium ion, is transported across the solid polymer electrolyte permionic membrane to the cathodic hydroxyl evolution catalyst on the opposite surface of the permionic membrane. The alkali metal ion, that is the sodium ion or potassium ion, is transported with its water of hydration, but with substantially no transport of bulk electrolyte.

Hydroxyl ion is evolved at the cathodic hydroxyl ion evolution catalyst as is hydrogen. However, in an alternative exemplification, a cathodic depolarization catalyst, i.e., an $HO_2^-$ disproportionation catalyst, is present in the vicinity of the cathodic surface of the permionic membrane and an oxidant is fed to the catholyte compartment to avoid the generation of gaseous cathodic products.

THE FIGURES

FIG. 1 is an exploded view of a bipolar, solid polymer electrolyte electrolyzer.

FIG. 2 is a perspective view of a solid polymer electrolyte unit of the bipolar electrolyzer shown in FIG. 1.

FIG. 3 is a cutaway elevation of the solid polymer electrolyte unit shown in FIG. 2.

FIG. 4 is a cutaway elevation, in greater magnification of the solid polymer electrolyte sheet shown in the unit of FIGS. 2 and 3.

FIG. 5 is a perspective view of the distributor showing one form of electrolyte feed and recovery.

FIG. 6 is a cutaway side elevation of the distributor shown in FIG. 5.

FIG. 7 is a perspective view of one exemplification of the bipolar element shown in FIG. 1.

FIG. 8 is a cutaway side elevation of the bipolar element shown in FIG. 7.

FIG. 9 is a perspective view of an alternative exemplification of a bipolar element having heat exchange means passing therethrough.

FIG. 10 is a cutaway side elevation of the bipolar element shown in FIG. 9.

FIG. 11 is a perspective view of an alternative exemplification of a bipolar element having distributor means combined with the bipolar element.

FIG. 12 is a cutaway side elevation of the bipolar element shown in FIG. 11.

FIG. 13 is a schematic cutaway side elevation of the solid polymer electrolyte electrolytic cell.

FIG. 14 is a schematic of the solid polymer electrolyte chloralkali process.

DETAILED DESCRIPTION OF THE INVENTION

The chlor alkali cell shown schematically in FIG. 14 has a solid polymer electrolyte 31 with a permionic membrane 33 therein. The permionic membrane 33 has an anodic surface 35 with chlorine catalyst 37 bearing thereon and a cathodic surface 41 with cathodic hydroxyl evolution catalyst 43 bearing thereon. Also shown is an external power supply connected to the anodic catalyst 37 by distributor 57 and connected to the cathodic catalyst 43 by distributor 55.

Brine is fed to the anodic side of the solid polymer electrolyte 31 where it contacts the anodic chlorine evolution catalyst 37 on the anodic surface 35 of the permionic membrane 31. The chlorine, present as chloride ion in the solution, forms chlorine according to the reaction:

The alkali metal ion, that is sodium ion or potassium ion, shown in FIG. 14 as sodium ion, and its water of hydration, passes through the permionic membrane 33 to the cathodic side 41 of the permionic membrane 33.

Water is fed to the catholyte compartment both externally, and as water of hydration passing through the permionic membrane 31. The stoichiometric reaction at the cathodic hydroxyl evolution catalyst is:

$$H_2O + e^- \rightarrow OH^- + \tfrac{1}{2}H_2$$

In an alternative exemplification, a cathode depolarizing catalyst and an oxidant are present whereby to avoid the generation of gaseous hydrogen.

The structure for accomplishing this reaction is shown generally in FIG. 13 where electrolytic cell 11 is shown with walls 21 and a permionic membrane 33 therebetween. The permionic membrane 33 has an anodic surface 35 with a supported anodic electrocatalyst 37 bearing upon the anodic surface 35, and a cathodic surface 41 with a supported cathodic electrocatalyst 43 bearing upon the cathodic surface 41. In an alternative exemplification, a cathode depolarization catalyst, that is an $HO_2^-$ disproportionation catalyst, (not shown) is in the vicinity of the cathodic surface 41 of the membrane 33 whereby to avoid the evolution of hydrogen gas.

Means for conducting electrical current from the walls 21 to the electrocatalysts, 37 and 43 are as shown as distributor 57 in the anolyte compartment 39 which conducts current from the wall 21 to the anodic chlorine evolution catalyst 37, and distributor 55 in the catholyte compartment 45 which conducts current from the wall 21 to the cathodic hydroxyl evolution catalyst 43.

In a preferred exemplification, the distributors, 55 and 57 also provide turbulence and mixing of the respective electrolytes. This avoids concentration polarization, gas bubble effects, stagnation, and dead space.

Another particularly preferred exemplification is one in which the surfaces of the current distributors, 55 and 57, bearing upon the permionic membrane 33 comprise electrocatalyst. The electrocatalyst is present as a coating or film on the current collectors 55 and 57.

In a particularly preferred alternative exemplification the current distributors 55 and 57 bear upon electrode substrates or supports, not shown, which bear upon the permionic membrane 33. Preferably the supports or substrates are such as to provide an open area for flow of electrolyte, and spacing between elements of the supports, i.e., mesh or solid portion, whereby to provide a substantially uniform current distribution across the face of the permionic membrane 33, thereby avoiding adjacent areas of high current density and of lo current density.

This may be accomplished by utilizing as the electrode support or substrate a fine, coated screen, e.g., a screen of 10 to 30 or more mesh per inch, and a wire diameter of 1 millimeter or less whereby to provide at least about 40 to 60 percent open area. Alternatively, the electrode support or substrate may be a coated, perforated sheet, or plate, e.g., having perforations of about 1 millimeter or less on a pitch so as to provide at least above about 40 to 60 percent open area, and preferably from about 60 to about 80 percent open area.

The cell voltage electrode potential, and electrode current efficiency are functions of the pressure of the electrode material bearing upon the permionic membrane, 33. The voltage initially decreases with increasing pressure, i.e., compression of the membrane 33 between the electrode 37, 43. Thereafter, the rate of voltage decrease with increasing pressure diminishes and ultimately a constant voltage is attained which voltage is substantially independent of increasing pressure.

The pressure-voltage relationship is a function of the resiliency and elasticity of the current collectors, of the electrode substrates, and of the permionic membrane, the geometry of the current collectors and the electrode substrates, i.e., open area, the spacing between individual substrate elements, and the size of the individual substrate elements, the internal reinforcement of the permionic membrane, and thickness of the permionic membrane. For any electrode permionic membrane combination, the determination of a satisfactory pressure, e.g., the pressure at which increasing imposed pressures give no significant decrease in voltage, is a matter of routine experimentation.

For unreinforced Asahi Glass FLEMION carboxylic acid membranes with electrodes substrates of 8 to 10 strands of about one millimeter diameter, per inch, the anode substrate being titanium, and the cathode substrate being steel, compressive pressures of at least 1 pound per square inch up to about 20 pounds per square inch yield voltage reductions.

In cell operation, brine is fed to the anolyte compartment 39 through brine inlet 81a and depleted brine is withdrawn from the anolyte compartment 39 through brine outlet 81b. The anolyte liquor may be removed as a chlorine gas containing froth, or liquid chlorine and liquid brine may be removed together.

Water is fed to the catholyte compartment 45 through water feed means 101a to maintain the alkali metal hydroxide liquid thereby avoiding deposition of solid alkali metal hydroxide on the membrane 33. Additionally, oxidant may be fed to the catholyte compartment 45, for example when an $HO_2^-$ disproportionation catalyst is present, whereby to avoid formation of hydrogen gas and to be able to withdraw a totally liquid cathode product.

While the configuration of the solid polymer electrolyte of this invention is useful in either monopolar or bipolar cells, a particularly desirable cell structure is a bipolar electrolyzer utilizing a solid polymer electrolyte. FIG. 1 is an exploded view of a bipolar solid polymer electrolyte electrolyzer. The electrolyzer is shown with two solid polymer electrolytic cells 11 and 13. There could however be many more such cells in the electrolyzer 1. The limitation on the number of cells, 11 and 13, in the electrolyzer 1 is imposed by rectifier and transformer capabilities as well as the possibilities of current leakage. However, electrolyzers containing upwards from 150 or even 200 or more cells are within the contemplation of the art utilizing presently available rectifier and transformer technologies.

Individual electrolytic cell 11 contains a solid polymer electrolyte unit 31 shown as a part of the electrolyzer in FIG. 1, individually in FIG. 2, in partial cutaway in FIG. 3, and in higher magnification in FIG. 4 with the catalyst mesh 37 and 43 exaggerated. Solid polymer electrolyte unit 31 is also shown schematically in FIGS. 13 and 14.

The solid polymer electrolyte unit 31 includes a permionic membrane 33 with anodic chlorine evolution catalyst 37 bearing on the anodic surface 35 of the permionic membrane 33 and cathodic hydroxyl evolution catalyst 43 bearing on the cathodic surface 41 of the permionic membrane 33.

The cell boundaries, may be, in the case of an intermediate cell of the electrolyzer 1, a pair of bipolar units 21 also called bipolar backplates. In the case of the first and last cells of the electrolyzer, such as cells 11 and 13 shown in FIG. 1, a bipolar unit 21 is one boundary of the individual electrolytic cell, and end plate 71 is the opposite boundary of the electrolytic cell. The end plate 71 has inlet means for brine feed 81a, outlet means for brine removal 81b, inlet means water feed 101a, and hydroxyl solution removal 101b. Additionally, when the cathode is depolarized, oxidant feed, not shown, would also be utilized. The end plate 71 also includes current connectors 79.

In the case of an monopolar cell, the end units would be a pair of end plates 71 as described above.

The end plate 71 and the bipolar units 21 provide gas tight and electrolyte tight integrity for the individual cells. Additionally, the end plate 71 and the bipolar units 21 provide electrical conductivity, as well as in various embodiments, electrolyte feed and gas recovery.

The bipolar unit 21, shown in FIGS. 7 and 8 has an anolyte resistant surface 23 facing the anodic surface 35 and anodic catalyst 37 of one cel 11. The anolyte resistant surface 35 contacts the anolyte liquor and forms the boundary of the anolyte compartment 39 of the cell. The bipolar unit 21 also has a catholyte resistant surface 25 facing the cathodic surface 41 and cathode catalyst 43 of the solid polymer electrolyte 31 of the next adjacent cell 13 of electrolyzer 1.

The anolyte resistant surface 23 can be fabricated of a valve metal, that is a metal which forms an acid resistant oxide film upon exposure to aqueous acidic solutions. The valve metals include titanium, tantalum, tungsten, columbium, hafnium, and zirconium, as well as alloys of titanium, such as titanium with yttrium, titanium with palladium, titanium with molybdenum, and titanium with nickel. Alternatively, the anolyte resistant surface may be fabricated of silicon or a silicide.

The catholyte resistance surface 25 may be fabricated of any material resistant to concentrated caustic solutions containing either oxygen or hydrogen or both. Such materials include iron, steel, stainless steel and the like.

The two members 23 and 25 of the bipolar unit 21 may be sheets of titanium and iron, sheets of the other materials specified above, and there may additionally be a hydrogen barrier interposed between the anodic surface 23 and cathodic surface 25, whereby to avoid the transport of hydrogen through the cathodic surface 25 of a bipolar unit to the anodic surface 23 of the bipolar unit.

The individual electrolytic cells, e.g., 11 and 13 of bipolar electrolyzer 1, also include distributor means 51 which may be imposed between the ends of the cell, that is between the bipolar unit 21 or end wall 71 and the solid polymer electrolyte 31. This distributor means is shown in FIG. 1 and individually in FIGS. 5 and 6 with the catholyte liquor conduits 105a and 105b and the catholyte feed 111a and catholyte recovery 111b.

The peripheral wall 53 of the distributor 51 is shown as a circular ring. It provides electrolyte tight and gas tight integrity to the electrolyzer 1 as well as to the cells 11 and 13.

The packing, which may be caustic resistant as packing 55, or acidified, chlorinated, brine and chlorine resistant, as packing 57, is preferably resilient, conductive, and substantially noncatalytic. That is, packing 55 of the catholyte unit, in the catholyte compartment 45 has a higher hydrogen evolution or hydroxyl ion evolution over voltage then cathodic catalyst 43 whereby to avoid the electrolytic evolution of cathodic product thereon. Similarly, the packing 57 in the anolyte compartment 39 has a higher chlorine evolution over voltage and higher oxygen evolution over voltage than the anodic catalyst 37 whereby to avoid the evolution of chlorine or oxygen thereon.

The packing 55, and 57 serves to conduct current from the boundary of the cell such as bipolar unit 21 or end plate 71, to the electrodes bearing on the solid polymer electrolyte 31. This necessitates a high electrical conductivity. The conduction is carried out while avoiding product evolution thereon, as described above. Similarly, the material must have a minimum of contact resistance at the electrodes 37, 43 and at the boundaries of the individual cell 11, e.g., end wall 71 or bipolar unit 21.

Furthermore, the distributor packing 55, 57 distributes and diffuses the electrolyte in the anolyte compartment 39 or catholyte compartment 45 whereby to avoid concentration polarization, the build up of stagnant gas and liquid pockets, and the build up of solid deposits such as potassium hydroxide or sodium hydroxide deposits.

The packing 55, 57 may be carbon, for example in the form of graphite, carbon felt, carbon fibers, porous graphite, activated carbon or the like. Alternatively, the packing may be a metal felt, a metal fiber, a metal sponge, metal screen, graphite screen, metal mesh, graphite mesh, or clips or springs or the like, such clips or springs bearing on the electrode supports or substrates and on the bipolar unit 21 of the end plate 71. Alternatively, the packing 51,57 may be packing as rings, spheres, cylinders or the like, packed tightly to obtain high conductivity and low electrical contact resistance.

In one exemplification the brine feed 87a and brine withdrawal 87b, as well as the water and oxidant feed 111a, and catholyte liquor recovery 111b, may be combined with distributors 51,51. In such an exemplification the feed 87a and 111a extend into the packing 55 and 57 and the withdrawal 87b and 111b extends from the packing 55 and 57.

In an alternative exemplification the reagent feed and product recovery may be to a microporous distributor, for example microporous hydrophilic or microporous hydrophobic films bearing upon the solid polymer electrolyte 31 and electrode supports or substrates and under compression by the distributor means 55 and 57.

As described above, individual solid polymer electrolyte electrolytic cells 11 and 13 includes a solid polymer electrolyte 31 with a permionic membrane 33 having anodic catalyst 37 bearing on the anodic surface 35 thereof, and cathodic catalyst 43 bearing on the cathodic surface 41 thereof. The boundaries of the cell may be a bipolar unit 21 or an end plate 71, with electrical conduction between the boundaries and the electrode substrates or supports being by distributor means 51. Reagent feed 87a and 111a and product recovery 87b and 111b are also provided. Additionally, there must be provided means for maintaining and providing an electrolyte tight, gas tight seal as gasket 61. While gasket 61 is only shown between walls 71 and bipolar units 21, and the distributors 51, it is to be understood that additionally or alternatively, gasket 61 may be interposed between the distributors 51, and the solid polymer electrolyte 31.

Gaskets in contact with the anolyte compartment 39 should be made of any material that is resistant to acidified, chlorinated brine as well as to chlorine. Such materials include unfilled silicon rubber as well as various resilient fluorocarbon materials.

The gaskets 61 in contact with the catholyte compartment 45 may be fabricated of any material which is resistant to concentrated caustic soda.

One particularly satisfactory flow system is shown generally in FIG. 1 where the brine is fed to the electrolyzer 1 through brine inlet 81a in the end unit 71, e.g., with a hydrostatic head. The brine then passes through conduit 83a in the "O" ring or gasket 61 to and through conduit 85a in the distributor 51 on the cathodic side 45 of cell 11, and thence to and through conduit 89a in the solid polymer unit 31 to anodic distributor 51 on the anodic side 35 of the solid polymer 31 of the electrolytic cell 11. At the distributor 51 there is a "T" opening and outlet with conduit 91a passing through the distributor 51 and outlet 87a delivering electrolyte to the anolyte chamber. The flow then continues, from conduit 91a in distributor 51 to conduit 93a in the next "O" ring or gasket through conduit 95a in the bipolar unit 21 and on to the next cell 13 where the fluid flow is substantially as described above. Brine is distributed by the packing 57 in the distributor 51 within the anolyte compartment 39. Distribution of the brine sweeps chlorine from the anodic surface 35 and anodic catalyst 37 to avoid chlorine stagnation.

The depleted brine is drawn through outlet 87b of the distributor 51 to return conduit 91b e.g. by partial vacuum or reduced pressure. The return is then through return conduit 89b in the solid polymer electrolyte unit 31, the conduit 86b in the cathodic distributor 51, conduit 83b in the "O" ring or gasket 61 to outlet 81b where the depleted brine is recovered from the electrolyzer 1.

While the brine feed has been shown with one inlet system and one outlet system, i.e. the recovery of depleted brine and chlorine through the same outlets, it is to be understood that depleted brine and chlorine may be separately recovered. It is also to be understood, that depending upon the internal pressure of the anolyte compartment 39 and the temperature of the anolyte liquor within the anolyte compartment, the chlorine may either be a liquid or a gas.

Water and oxidant enter the electrolyzer 1, through inlet 101a in the end unit 71. The water and oxidant then proceed through conduit 103a in the "O" ring or gasket 61 to conduit 105a and "T" in cathodic distributor 51 on the cathodic side 45 of cell 11. The "T" outlet includes conduit 105a and outlet 111a. Water and oxidant are delivered by outlet 111a in ring 53 of the distributor 51 to the catholyte resistant packing 55 within the catholyte chamber 45 of cell 11. The cell liquor, that is the aqueous alkali metal hydroxide, such as sodium hydroxide or potassium hydroxide, is recovered from the cathodic surface 41 of the solid polymer electrolyte permionic membrane 33 by the water carried into the cell 11. When oxidant is present, liquid is recovered through the outlet 111b. When there is no oxidant, gas and liquid may both be recovered through 111b, or, in an alternative exemplification, a separate gas recovery line, not shown, may be utilized.

While, the electrolyzer is shown with common feed for oxidant and water, and with common recovery for gas and liquid, there may be three conduits present, 111a, 111b and a third conduit, not shown, for water feed, oxidant feed, and liquid recovery. Alternatively, there may be three conduits 111a, 111b and a third conduit, not shown, for water feed, liquid recovery and gas recovery.

Returning to overall flows in the electrolyzer 1, conduit 105a continues to conduit 107a of the solid polymer electrolyte unit 31 to conduit 109a of the anodic distributor 51 which continues through to conduit 113a of the O ring or gasket 61 thence to conduit 115a of the bipolar unit 21, where the same path through individual cell 13 is followed as in cell 11. Similarly the network may be continued for further cells.

The recovery of product is shown as being from distributor 51 through outlet 111b to conduit 105b thence to conduit 103b in the O ring or gasket 61 to outlet 101b in the end wall 71.

While the flow is described as being to and through distributors 51, as described above, the flow could also be through other paths. For example, the inlet or outlet or both could be in the bipolar unit 21 which bipolar unit would carry porous film or outlet pipes from unit 21. Alternatively, the inlet or outlet or both could be part of the solid polymer electrolyte unit 31.

While the flow is described as being in parallel to each individual cell 11 and 13, it could be serial flow. Where serial flow of the brine is utilized, the T, outlet 87-conduit 91 can be an L rather than a T. In an exemplification where serial flow is utilized, there would be lower brine depletion in each cell, with partially depleted brine from one cell fed to the next cell for further partial depletion. Similarly, where there is serial flow of the catholyte liquor, the T, conduit 105-outlet 111 could be an L.

Where serial flow is utilized the flow could be concurrent with high sodium or high potassium ion concentration gradients across the solid polymer electrolyte 33 or countercurrent with lower sodium or potassium ion concentration gradients across the individual solid polymer electrolyte units 31.

The bipolar electrolyzer may be either horizontally or vertically arrayed, that is the bipolar electrolyzer 1 may have a solid polymer electrolyte units 31 with either a horizontal membrane 33 or a vertical membrane 33. Preferably the membrane 33 is horizontal with the anodic electrocatalyst 37 bearing on top of the permionic membrane 33 and the cathodic electrocatalyst 43 bearing on the bottom of the permionic membrane 33. A horizontal design offers various advantages. Under low pressure operation, chlorine bubbles flow up through the anolyte compartment 39. In the catholyte compartment 45, the horizontal configuration prevents the build up of concentrated alkali metal hydroxide on the bottom surface 41 of the permionic membrane 33, while allowing for the bottom surface 41 of the permionic membrane 33 to be wet with alkali metal hydroxide. Additionally, where oxidant is present, especially gaseous oxidant, the horizontal configuration allows the oxidant to be in contact with the cathodic surface 41 of the permionic membrane 33.

The solid polymer electrolyte 31 contains a permionic membrane 33. The permionic membrane 33 should be chemically resistant, cation selective, with anodic chlorine evolution catalyst 37 on the anodic surface 35 and cathodic, hydroxyl evolution catalyst 43 on the cathodic surface 41 thereof.

The flurocarbon resin permionic membrane 33 used in providing the solid polymer electrolyte 31 is characterized by the presence of cation selective ion exchange groups, the ion exchange capacity of the membrane, the concentration of ion exchange groups in the membrane on the basis of water absorbed in the membrane, and the glass transition temperature of the membrane material.

The flurocarbon resins herein contemplated have the moieties:

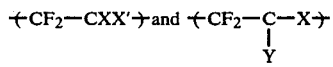

where X is —F, —Cl, —H, or —CF$_3$; X' is —F, —Cl, —H, —CF$_3$ or CF$_3$(CF$_2$)$_m$—; m is an integer of 1 to 5; and Y is —A,——A, —P—A, or —O—(CF$_2$)$_n$ (P, Q, R)—A.

In the unit (P, Q, R), P is —(CF$_2$)$_a$(CXX')$_b$(CF$_2$)$_c$, Q is (—CF$_2$—O—CXX')$_d$, R is (—CXX'—O—CF$_2$)$_e$, and (P, Q, R) contains one or more of P, Q, R.

$\phi$ is the phenylene group; n is 0 or 1; a, b, c, d and e are integers from 0 to 6.

The typical groups of Y have the structure with the acid group, A, connected to a carbon atom which is connected to a fluorine atom. These include —(CF$_2$)$_x$A, and side chains having ether linkages such as:

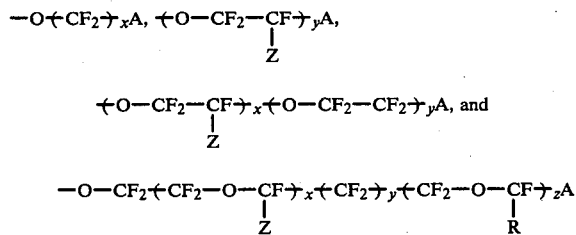

where x, y, and z are respectively 1 to 10; Z and R are respectively —F or a C$_{1-10}$ perfluoroalkyl group, and A is the acid group as defined below.

In the case of copolymers having the olefinic and olefin-acid moieties above described, it is preferably to have 1 to 40 mole percent, and preferably especially 3 to 20 mole percent of the olefin-acid moiety units in order to produce a membrane having an ion-exchange capacity within the desired range.

A is an acid group chosen from the group consisting of
—SO$_3$H
—COOH
—PO$_3$H$_2$, and
—PO$_2$H$_2$,
or a group which may be converted to one of the aforesaid groups by hydrolysis or by neutralization.

In one exemplification A may be either —SO$_3$H or a functional group which can be converted to —SO$_3$H by hydrolysis or neutralization, or formed from —SO$_3$H such as —SO$_3$M', (SO$_2$—NH) M'', —SO$_2$NH—R$_1$—NH$_2$, or —SO$_2$NR$_4$R$_5$NR$_4$R$_6$; M' is an alkali metal; M'' is H, NH$_4$ an alkali metal or an alkali earth metal; R$_4$ is H Na or K; R$_5$ is a C$_3$ to C$_6$ alkyl group, (R$_1$)$_2$NR$_6$, or R$_1$NR$_6$(R$_2$)$_2$ NR$_6$; R$_6$ is H, Na, K, or —SO$_2$; and R$_1$ is a C$_2$-C$_6$ alkyl group.

In a particularly preferred exemplification of this invention, A may be either —COOH, or a functional group which can be converted to —COOH by hydrolysis or neutralization such as —CN, —COF, —COCl, —COOR$_1$, —COOM, —CONR$_2$R$_3$; R$_1$ is a C$_{1-10}$ alkyl group and R$_2$ and R$_3$ are either hydrogen or C$_1$ to C$_{10}$ alkyl groups, including perfluoroalkyl groups, or both.

M is hydrogen or an alkali metal; when M is an alkali metal it is most preferably sodium or potassium.

Cation selective permionic membranes where A is either —COOH, or a Functional group derivable form or convertible to —COOH, e.g., —CN, —COF,CoCl, —COOR$_1$, —COOM, or —CONR$_2$R$_3$, as described above, are especially preferred because of their voltage advantage over sulfonyl membranes. This voltage advantage is on the order of about 0.1 to 0.4 volt at a current density of 150 to 250 amperes per square foot, a brine content of 150 to 300 grams per liter of sodium chloride, and a caustic soda content of 15 to 40 weight percent sodium hydroxide. Additionally, the carboxylic acid type membranes have a current efficiency advantage over sulfonyl type membranes at high anolyte pH values, e.g., above about 4.0 and with anodes having an oxygen evolution overvoltage at least about 0.2 volt above the chlorine evolution overvoltage thereof.

The membrane material herein contemplated has an ion exchange capacity from about 0.5 to about 2.0 milligram equivalents per gram of dry polymer, and preferably from about 0.9 to about 1.8 milligram equivalents per gram of dry polymer, and in a particularly preferred exemplification, from about 1.1 to about 1.7 milligram equivalents per gram of dry polymer. When the ion exchange capacity is less than about 0.5 milligram equivalents per gram of dry polymer the current efficiency is low at the high concentrations of alkaline metal hydroxide herein contemplated, while when the ion exchange capacity is greater than about 2.0 milligrams equivalents per gram of dry polymer, the current efficiency of the membrane is too low.

The content of ion exchange groups per gram of absorbed water is from about 8 milligram equivalents per gram of absorbed water to about 30 milligram equivalents per gram of absorbed water and preferably from about 10 milligram equivalents per gram of absorbed water to about 28 milligram equivalents per gram of absorbed water, and in a preferred exemplification from about 14 milligram equivalents per gram of absorbed water to about 26 milligram equivalents per gram of absorbed water. When the content of ion exchange groups per unit weight of absorbed water is less than about 8 milligram equivalents per gram or above about 30 milligram equivalents per gram the current efficiency is too low.

The glass transition temperature is preferably at least about 20° C. below the temperature of the electrolyte. When the electrolyte temperature is between about 95° C. and 110° C., the glass transition temperature of the fluorocarbon resin permionic membrane material is below about 90° C. and in a particularly preferred exemplification below about 70° C. However, the glass transition temperature should be above about −80° C. in order to provide satisfactory tensile strength of the membrane material. Preferably the glass transition temperature is from about −80° C. to about 70° C. and in a particularly preferred exemplification from about minus 80° C. to about 50° C.

When the glass transition temperature of the membrane is within about 20° C. f the electrolyte or higher than the temperature of the electrolyte the resistance of the membrane increases and the permselectivity of the membrane decreases. By glass transition temperature is meant the temperature below which the polymer segments are not energetic enough to either move past one another or with respect to one another by segmental Brownian motion. That is, below the glass transition temperature, the only reversible response of the polymer to stresses is strain while above the glass transition temperature the response of the polymer to stress is segmental rearrangement to relieve the externally applied stress.

The fluorocarbon resin permionic membrane materials contemplated herein have a water permeability of less than about 100 milliliters per hour per square meter at 60° C. in four normal sodium chloride at a pH of 10 and preferably lower than 10 milliliters per hour per square meter at 60° C. in four normal sodium chloride of the pH of 10. Water permeabilities higher than about 100 milliliters per hour per square meter, measured as described above, may result in an impure alkali metal hydroxide product.

The electrical resistance of the dry membrane should be from about 0.5 to about 10 ohms per square centimeter and preferably from about 0.5 to about 7 ohms per square centimeter.

Preferably the fluorinated-resin permionic membrane has a molecular weight, i.e., a degree of polymerization, sufficient to give a volumetric flow rate of about 100 cubic millimeters per second at a temperature of from about 150° to about 300° C.

The thickness of the permionic membrane 33 should be such as to provide a membrane 33 that is strong enough to withstand pressure transients and manufacturing processes, but thin enough to avoid high electrical resistivity. Preferably the membrane is from 10 to 1000 microns thick and in a preferred exemplification from about 50 to about 200 microns thick. Additionally, internal reinforcement, or increased thickness, or cross-linking may be utilized, or even lamination may be utilized whereby to provide a strong membrane.

The catalyst 37,43 bearing on the surface of the permionic membrane 33 and supported on the substrate, as described above, may be a precious metal-containing catalyst, such as a platinum group metal or alloy of a platinum group metal or an intermetallic compound of a platinum group metal or an oxide, carbide, nitride, boride, silicide, or sulphide of a platinum group metal. Such precious metal-containing catalysts are characterized by a high surface area. Additionally, the precious metal-containing catalyst may be a partially reduced oxide, or a black, such as platinum black or palladium black, or an electrodeposit or chemical deposit.

The catalysts 37, 43 may also be intermetallic compounds of other metals, including precious metals or non-precious metals. Such intermetallic compounds include pyrochlores, delafossites, spinels, perovskites, bronzes, tungsten bronzes, silicides, nitrides, carbides, and borides.

Especially desirable cathodic catalysts which may bear upon the solid polymer electrolyte permionic membrane 33 include steel, stainless steel, cobalt, nickel, alloys of nickel or iron, compositions of nickel, especially porous nickel with molybdenum, tantalum, tungsten, titanium, columbium or the like, and boride, electrically conductive, electrically active borides, nitrides, silicies and carbides, such as, the platinum group metal silicies, nitrides, carbides and borides and titanium diboride.

Additionally, the catalyst surface may have an outer, porous surface thereon whereby to avoid direct catalyst to permionic membrane contact, i.e., to avoid possible poisoning, oxidation, or removal of the anodic chlorine evolution catalyst by catholyte liquor which may be in or on the surface of the permionic membrane. The outer, porous surface is preferably non-conductive and with chlorine and oxygen evolution overvoltage above that of the underlying electrocatalyst. Suitable materials include ceramics, as silicates, as well as slightly catalytic oxides, i.e., oxides having a higher chlorine and oxygen evolution overvoltage than the underlying electrocatalyst, as spinels, pervoskites, and the like.

The catholyte liquor recovered from the cell typically will contain in excess of 20 weight percent alkali metal hydroxide. Where, as in a preferred exemplification, the permionic membrane 33 is a carboxylic acid membrane, as described hereinabove, the catholyte liquor may contain in excess of 30 to 35 percent, for example 40 or even 45 or more weight percent alkali metal hydroxide.

The current density of the solid polymer electrolyte electrolytic cell 11 may be higher than that in a conventional permionic membrane or diaphragm cell, for example, in excess of 200 amperes per square foot, and preferably in excess of 400 amperes per square foot. According to one preferred exemplification of this invention, electrolysis may be carried out at a current density of 800 or even 1,200 amperes per square foot, where the current density is definted as total current passing through the cell divided by the surface area of one side of the permionic membrane 33.

However, in order to attain the high current densities herein contemplated, a uniform current distribution across the face of the permionic membrane 33 is desirable. This may be accomplished, as described above, by utilizing electrode substrates having a high percentage of open area, e.g., above about 40 to 60 percent open area, and a narrow pitch, e.g., about 0.5 to 2 millimeters between substrate elements. A suitable substrate is mesh or screen having 10 to 30 or more strands per inch, where the strands are from about 0.5 to about 2.5 millimeters apart, centerline to centerline, and have a diameter such as to provide at least about 40, and preferably above about 60 percent open area. The mesh or screen is fabricated of a material that is resistant to the electrolyte and electrically conductive, and has an electrocatalytic surface thereon. Alternatively, the electrode support may be a coated sheet or plate, having perforations on a pitch of 0.5 to 1.5 millimeters, and at least about 40 to 60 percent open area.

According to a particularly preferred exemplification of the method of this invention, the cathode may be depolarized whereby to eliminate the formation of gaseous cathodic products. In operation with the depolarized cathode, oxidant is fed to the cathodic surface 41 of the solid polymer electrolyte 31 while providing a suitable catalysts 43 in contact with the cathodic surface 41 of the solid polymer electrolyte 31 whereby to avoid evolution of gaseous hydrogen. In this way, when the electrolyzer, 1, and the electrolytic cell, 11, is maintained at an elevated pressure, as described hereinabove, the evolution of gaseous products can be largely avoided, as can the problems associated therewith.

In the process of producing alkali metal hydroxide and chlorine by electrolyzing an alkali metal chloride brine, such as an aqueous solution of sodium chloride or potassium chloride, the alkali metal chloride solution is fed into the cell, a voltage is imposed across the cell, chlorine is evolved at the anode, alkali metal hydroxide is produced in the electrolyte in contact with the cathode, and hydrogen may be evolved at the cathode. The overall anode reaction is:

$$2Cl^- \rightarrow Cl_2 + 2e^- \quad (1)$$

while the overall cathode reaction is:

$$2H_2O + 2e^- \rightarrow H_2 + 2OH^- \quad (2)$$

More precisely, the cathode reaction is reported to be:

$$H_2O + e^- \rightarrow H_{ads} + OH^- \quad (3)$$

by which the monatomic hydrogen is adsorbed onto the surface of the cathode. In basic media, the adsorbed hydrogen is reported to be desorbed according to one of two alternative processes:

$$2H_{ads} \rightarrow H_2 \text{ or} \quad (4)$$

$$H_{ads} + H_2O + e^- \rightarrow H_2 + OH^- \quad (5)$$

The hydrogen desorption step, i.e., reaction (4) or reaction (5), is reported to be the hydrogen overvoltage determining step. That is, it is the rate controlling step and its activation energy corresponds to the cathodic hydrogen overvoltage. The cathode voltage for the hydrogen evolution reaction (2) is on the order of about 1.5 to 1.6 volts versus a saturated calomel electrode (SCE) on iron in basic media of which the hydrogen overvoltage component is about 0.4 to 0.5 volt.

One method of reducing the cathode voltage is to provide a substitute reaction for the evolution of gaseous hydrogen, that is, to provide a reaction where a liquid product is formed rather than gaseous hydrogen. Thus, water may be formed where an oxidant is fed to the cathode. The oxidant may be a gaseous oxidant such as oxygen, air, or the like. Alternatively, the oxidant may be a liquid oxidant such as hydrogen peroxide, a hydroperoxide, a peroxy acid or the like.

When the oxidant is oxygen, e.g., as air or as gaseous oxygen, the following reaction is believed to take place at the cathode:

$$O_2 + 2H_2O + 4e^- \rightarrow 4OH^- \quad (6)$$

This reaction is postulated to be an electron transfer reaction:

$$O_2 + H_2O + 2e^- \rightarrow HO_2^- + OH^- \quad (7)$$

followed by a surface reaction:

$$2HO_2^- \rightarrow O_2 + 2OH^- \quad (8)$$

It is believed that the predominant reaction on the hydrophobic surface is reaction (7), with reaction (8) occurring on the surfaces of the catalyst particles 43 dispersed in and through the cathode surface 41 of the solid polymer electrolyte 33. Such catalyst particles include particles of electrocatalysts as described hereinbelow. In this way, the high overvoltage hydrogen desorption step is eliminated.

Where the oxidant is a peroxy compound, the following reaction is believed to take place at the cathode:

$$RCOO^- + 2H_2O + 2e^- \rightarrow RCOH + 3OH^- \quad (9)$$

This reaction is postulated to be an electron transfer reaction followed by a surface reaction.

According to a still further exemplification the oxidant may be a redox couple, i.e., a reduction-oxidation couple, where the oxidant is reduced inside the cell and thereafter oxidized outside the cell, as for return to the cell.

According to a further exemplification of the method of this invention, where a redox couple is utilized, the redox couple may be a quinone-hydroquinone redox couple.

The cathode catalysts useful in carrying out the method of this invention are those having properties as $HO_2^-$ disproportionation catalysts, i.e., catalysts that are capable of catalyzing the surface reaction $$2HO_2^- \rightarrow O_2 + 2OH^- \quad (10).$$

Additionally, the catalyst should either be capable of catalyzing the electron transfer reaction $$O_2 + H_2O + 2e^- \rightarrow HO_2^- + OH^- \quad (11),$$

or of being used in conjunction with such a catalyst. The catalysts herein contemplated should also be chemically resistant to the catholyte liquor.

Satisfactoy $HO_2^-$ to disproportionation catalysts include carbon, the transition metals of Group VIII, being iron, cobalt, nickel, palladium, ruthenium, rhodium, platinum, osmium, iridium, and compounds thereof. Additionally, other catalysts such as copper, lead and oxides of lead may be used. The transition metals may be present as the metals, as alloys, and as intermetallic compounds. For example, when nickel is used, it may be admixed with Mo, Ta, or Ti. These admixtures serve to maintain a low cathodic voltage over extended periods of electrolysis.

Any metal of Group III B, IV B, V B, VI B, VII B, I B, II B, or III A, including alloys and mixtures thereof, which metal or alloy is resistant to the catholyte can be used as the cathode coating on the substrate or support, or catalyst bearing on the surface of the membrane 33.

Additionally, solid metalloids, such as phthalocyanines of the Group VIII metals, perovskites, tungsten bronzes, spinels, delafossites, and pyrochlores, among others, may be used as a catalytic surface 43 of the membrane 33.

Particularly preferred catalysts are the platinum group metals, compounds of platinum group metals, e.g., oxides, carbides, silicides, phosphides, and nitrides thereof, and intermetallic compounds and oxides thereof, such as rutile form $RuO_2\text{-}TiO_2$ having semiconducting properties.

Where a gaseous oxidant, as air or oxygen is utilized, the portion of the catalyst intended for electron transfer is hydrophilic while the portion intended for the surface reaction may be hydrophilic or hydrophobic and preferably hydrophobic. The surface reaction catalyst is hydrophobic or is embedded in or carried by a hydrophobic film. The hydrophobic film may be a porous hydrophobic material such as graphite or a film of a fluorocarbon polymer on the catalyst. The surface reaction catalyst, as described above, and the electron transfer catalyst should be in close proximity. They may be admixed, or they may be different surfaces of the same particle. For example, a particularly desirable catalyst may be provided by a microporous film on the permionic membrane surface 41 with catalyst 43 carried by a hydrophobic microporous film.

According to a further exemplification of this invention utilizing a depolarized cathode, the electrodes can be weeping electrodes i.e., that weep oxidant. In the utilization of weeping electrodes, the oxidant is distributed through the distributor 51 to the catalytic particles 43 thereby avoiding contact with catholyte liquor in the catholyte compartment 45. Alternatively, the oxidant may be provided by a second distributor means, bearing upon the cathodic surface 41 of the permionic membrane 33 or upon the catalytic particles 43.

The feed of oxidant may be gaseous, including excess air or oxygen. Where excess air or oxygen is utilized, the excess air or oxygen serves as a heat exchange medium to maintain the temperature low enough to keep the liquid chlorine vapor pressure low. Alternatively, the use of multiple oxidants, such as air and oxygen, or air and a peroxy compound, or oxygen and a peroxy compound, or air or oxygen and a redox couple, may be utilized. Where air or oxygen is used as the oxidant, it should be substantially free of carbon dioxide whereby to avoid carbonate formation on the cathode.

Utilization of a horizontal cell is particularly advantageous where cathode depolarization is utilized. Especially satisfactory is the arrangement where the anodic catalyst 37 bears upon the top of the permionic membrane 31 and the cathodic catalyst 43 bears upon the bottom of the permionic membrane 33. This avoids flooding the oxidation catalyst, that is, the $HO_2^-$ disproportionation catalyst, with alkali metal hydroxide, while providing a thin film of alkali metal hydroxide at the membrane surface 41 adjacent to the cathode surface and enhances the contact of the catalyst 43 and the oxidant.

While the method of this invention has been described with reference to specific exemplifications, embodiments, and examples, the scope is not to be limited except as limited by the claims appended hereto.

We claim:

1. In an electrolytic cell comprising an anolyte compartment with an anode therein, a catholyte compartment with a cathode therein, and a permionic membrane therebetween, said anode and cathode each comprising an electroconductive substrate having electrocatalyst bonded thereto, the electrocatalyst removably bearing upon the permionic membrane, the improvement wherein the electroconductive substrates have at least about 40 percent open area, the anode and cathode compress the permionic membrane therebetween by about 1 to 20 pounds per square inch, and the permionic membrane comprises a fluorocarbon resin having the moieties:

$$-(CF_2-CXX')-$$

and, $$-(CF_2-CXY)-$$

where,

X is chosen from the group consisting of —F, —Cl, —H, and —$CF_3$;

X' is chosen from the group consisting of —F, —Cl, —H, —$CF_3$ and $(CF_2)_m CF_3$, where m is an integer from 1 to 5;

Y is chosen from the group consisting of —A, $\phi$A, —P—A, and —O—$(CF_2)_n$—(P,Q,R)—A, where P is $CCF_2)_a$ $(CXX')_b$ $(CF_2)_c$, Q is (—$CF_2$—O—$CXX')_d$ and R is (—$CXX'$)—O—$CF_2)_e$, (P,Q,R) is or contains one or more P, Q, and R;

n is 0 or 1;

a,b,c,d and e are integers from 0 to 6;

$\phi$ is a phenylene group and A is chosen from the group consisting of —COOH, —CN, —COF, —COCl, —COOR, —COOM, —$CONR_2R_3$, —$CO_3H$, $PO_3H_2$, and $PO_2H_2$ where $R_1$ is a $C_1$ to $C_{10}$ alkyl group, and $R_2$ and $R_3$ are chosen from the group consisting of —H, and $C_1$ to $C_{10}$ alkyl groups; and M is chosen from the group consisting of —H and alkali metals.

2. The electrolytic cell of claim 1 wherein the said pressure at which the electrodes bear upon and compress the permionic membrane is sufficient to reduce the cell voltage relative to an uncompressed permionic membrane, and the electrode substrates have from about 40 to about 80 percent open area.

3. The electrolytic cell of claim 1 wherein the permionic membrane has a substantially uniform current distribution across the face thereof.

4. The electrolytic cell of claim 1 wherein Y is chosen from the group consisting of —$CF_2$—$_x$A, —O—$CF_2)_x$A, —O$(CF_2)_x$A, $(OCF_2CFZ$—$_y$A, —$OCF_2CFZ$—$_x$—$OCF_2CF_2$—A, and O—$CF_2$—$_{CF2}$(C-$F_2OCF$—Z—$_y$—$CF_2$—$_y$($CF_2OCFR$—$_z$, where x,y, and z are 1 to 10; and Z and R are chosen from the group consisting of —F and $C_1$ to $C_{10}$ alkyl groups.

* * * * *